(12) United States Patent
Lenz

(10) Patent No.: US 8,904,658 B2
(45) Date of Patent: Dec. 9, 2014

(54) METHOD FOR DETERMINING THE ORIENTATION OF TWO SHAFTS CONNECTED VIA TWO UNIVERSAL JOINTS AND A THIRD SHAFT IN THE PLANE OF THE THREE SHAFTS

(71) Applicant: Prüftechnik AG, Ismaning (DE)

(72) Inventor: Hans Lenz, Ismaning (DE)

(73) Assignee: Prüftechnik AG, Ismaning (DE)

( * ) Notice: Subject to any disclaimer, the term of this patent is extended or adjusted under 35 U.S.C. 154(b) by 224 days.

(21) Appl. No.: 13/666,382

(22) Filed: Nov. 1, 2012

(65) Prior Publication Data

US 2013/0111768 A1 May 9, 2013

Related U.S. Application Data

(60) Provisional application No. 61/557,023, filed on Nov. 8, 2011.

(51) Int. Cl.
*G01B 11/27* (2006.01)
*G01C 15/00* (2006.01)

(52) U.S. Cl.
CPC ............ *G01B 11/272* (2013.01); *G01C 15/004* (2013.01); *G01B 2210/58* (2013.01); *Y10S 33/21* (2013.01)
USPC ........................................ 33/286; 33/DIG. 21

(58) Field of Classification Search
CPC ........ G01B 11/272; G01B 5/25; G01B 11/27; G01B 5/008; G01B 7/31; G01B 21/24; G01B 21/32; G01B 2210/58; G01B 3/566; G01B 5/0002; G01B 5/043; G01B 5/14; G01B 5/24; G01C 15/004; G01C 19/38; G01C 19/56; G01C 19/5607; G01C 19/5649; G01C 15/002; G01C 15/006; G01C 15/06; G01C 15/12; G01C 5/04
USPC ...................................... 33/286, DIG. 21, 412
See application file for complete search history.

(56) References Cited

U.S. PATENT DOCUMENTS

| 4,518,855 | A | | 5/1985 | Malak | |
|---|---|---|---|---|---|
| 4,553,335 | A | * | 11/1985 | Woyton | ........................ 33/645 |
| 4,698,491 | A | | 10/1987 | Lysen | |
| 4,709,485 | A | | 12/1987 | Bowman | |
| 5,026,998 | A | | 6/1991 | Hölzl | |
| 5,684,578 | A | * | 11/1997 | Nower et al. | ................... 33/286 |
| 5,715,609 | A | * | 2/1998 | Nower | ........................... 33/412 |
| 6,411,375 | B1 | * | 6/2002 | Hinkle et al. | ................... 33/286 |
| 6,915,582 | B1 | * | 7/2005 | Engels | ............................ 33/286 |
| 7,175,342 | B2 | * | 2/2007 | Tanaka et al. | ................... 33/412 |

(Continued)

FOREIGN PATENT DOCUMENTS

DE      101 38 831 A1    2/2003

*Primary Examiner* — Yaritza Guadalupe-McCall
(74) *Attorney, Agent, or Firm* — Roberts Mlotkowski Safran & Cole, P.C.; David S. Safran

(57) ABSTRACT

A method for measuring and optionally correcting the angular offset of two shafts which are connected to one another by way of two universal joints and a third shaft calls for the measurement heads of an optoelectronic alignment device to be mounted in the shafts in exactly two measurement positions. These measurement positions are offset by 180° to one another and are located in the plane of the three shafts.

5 Claims, 7 Drawing Sheets

(56) References Cited

U.S. PATENT DOCUMENTS

| | | |
|---|---|---|
| 7,242,465 B2 | 7/2007 | Lacko et al. |
| 7,672,001 B2 | 3/2010 | Hermann |
| 8,533,965 B2* | 9/2013 | Stromberg ................. 33/412 |
| 8,689,455 B2* | 4/2014 | Smith et al. ................. 33/412 |
| 2004/0261278 A1* | 12/2004 | Bodgren et al. ............ 33/286 |
| 2013/0111768 A1* | 5/2013 | Lenz ........................... 33/228 |
| 2013/0219733 A1* | 8/2013 | Smith et al. ................ 33/645 |
| 2013/0326890 A1* | 12/2013 | Alexander et al. ......... 33/228 |
| 2013/0326891 A1* | 12/2013 | Alexander et al. ......... 33/228 |

* cited by examiner

METHOD FOR DETERMINING THE ORIENTATION OF TWO SHAFTS CONNECTED VIA TWO UNIVERSAL JOINTS AND A THIRD SHAFT IN THE PLANE OF THE THREE SHAFTS

CROSS REFERENCE TO RELATED APPLICATION

This application claims the benefit of, and incorporates by reference, U.S. Provisional Patent Application No. 61/557,023, filed on Nov. 8, 2011.

BACKGROUND OF THE INVENTION

1. Field of the Invention

The invention relates to an improved and simplified method for determining and correcting the angular offset of two shafts of machines or machine components which due to their parallel offset are connected to one another by way of two universal joints and a third shaft which connects the two universal joints.

2. Description of Related Art

It is conventional to equalize offsets between two shafts which connect engines and driven assemblies to one another via two universal joints and a third shaft. But this arrangement can only equalize parallel offsets. When the two shafts are not aligned exactly parallel to one another, serious damage often occurs due to an angular offset.

The two types of offsets, specifically parallel offset and angular offset, can be easily and accurately determined with optoelectronic alignment devices. However, this is only possible in the simpler case when the two shafts which are connected to one another run coaxially. These optical alignment devices based on lasers or other light sources and photosensitive detectors (PSD, CCD arrays or CMOS arrays) are described in German Patent DE 39 11 307 (which corresponds to U.S. Pat. No. 5,026,998) and German Patent DE 33 20 163 (which corresponds to U.S. Pat. No. 4,698,491). In these documents, alignment devices are described which, on the one hand, contain a light source in a measurement head and a detector in a second measurement head. In the measurement head, both the incidence position and also the incidence direction of a light beam can be measured by there being two detectors in succession in the beam path of the measurement head which can be read out two-dimensionally. This arrangement can be achieved, for example, via a beam splitter. On the other hand, measurement devices are also described in which one measurement head contains both a light source and also a two-dimensional detector, while the second measurement head contains a reflector, for example, in the form of a ridge prism. The alignment devices which are described in the aforementioned documents use light beams of point cross section and detectors which can be read out two-dimensionally.

German Patent Application DE 10 2006 023 926 (which corresponds to U.S. Pat. No. 7,672,001) describes alignment devices in which light beams are fanned out transversely relative to the propagation direction in more than one direction. Some embodiments call for each measurement head to contain both a light source and also a detector. The aforementioned optical alignment devices assume that the points of impact of the light beam or light beams on the detector or detectors is measured in several (at least three, but usually four or even five or more) rotary positions of the two shafts.

German Patent DE 33 35 336 (which corresponds to U.S. Pat. No. 4,518,855) describes an alignment device in which each measurement head contains both a light source and also detectors which can be read out two-dimensionally according to the site of incidence and angle of incidence. This measurement device is able to determine a misalignment according to angular and parallel offset in only one rotary position of the two shafts from one measurement of the points of impact on the detectors when the orientation of this rotary position and the points of impact are known for well aligned shafts by a comparison measurement on a single straight shaft. Measurements on the shafts which are to be aligned in different angular positions are, however, also fundamentally possible.

Often, special matching devices are employed for the use of these optoelectronic alignment devices for shafts which do not run coaxially, which therefore have a parallel offset and are connected via two universal joints and a third shaft. This device is shown in European Patent EP 1 430 995 (which corresponds to U.S. Pat. No. 7,242,465). The disadvantage in the use of these devices is that often the third shaft must be removed. Moreover, complicated handling of the devices and execution of a host of steps is necessary, which makes determining an angular offset complex and fault-susceptible. Thus, it can happen that an already correctly aligned machine is unintentionally shifted when the third shaft is re-installed. Another problem is that these devices are produced with overly large tolerances so that measurement of the angular offset becomes too inexact due to play.

SUMMARY OF THE INVENTION

The primary object of the present invention is to devise a method for determining the angular offset of two shafts which are connected via two universal joints and a third shaft, using an optical alignment device which makes superfluous the use of the aforementioned additional devices for measuring the angular offset of two shafts that are offset in parallel and which nevertheless enables high precision in the determination of the angular offset. Another object of the invention is to provide a simple and reliable method for determining the angular offset.

The method for achieving these objects comprises the following steps:

a) determining a first measurement position in the plane of the three shafts b) measuring the point or points of impact on the detector or detectors with an optical alignment device in the first measurement position, c) turning the shafts or the components of the alignment device around the shafts into a second measurement position, i.e., a position 180° from the first measurement position and positioning of one of the two measurement heads of the alignment device on the clamping device of the respective measurement head in the radial direction to the shaft on which the measurement head is mounted, this second measurement position likewise being located in the plane of the three shafts, d) measuring the point or points of impact on the detector or detectors with the alignment device in the position 180° from the first measurement position, therefore the second measurement position, e) determining the angle between the two axes from the results of steps b) and d), and optionally, correcting the angular alignment by changing the position of the movable machine or machine component.

Few simple steps are, therefore, sufficient to determine the angular offset with high precision. The determination of the angular offset is, in principle, possible with any of the indicated alignment devices from the aforementioned prior art. Here, it should simply be watched that the measurement devices are made such that the holding devices which connect the measurement heads to the shafts are configured such that a change of the position of the measurement heads in the radial direction relative to the shaft is possible, as becomes apparent from the following description.

Other details, aspects and advantages can be taken from the following description of the invention with reference to the accompanying drawings.

DETAILED DESCRIPTION OF THE INVENTION

Figure 1:
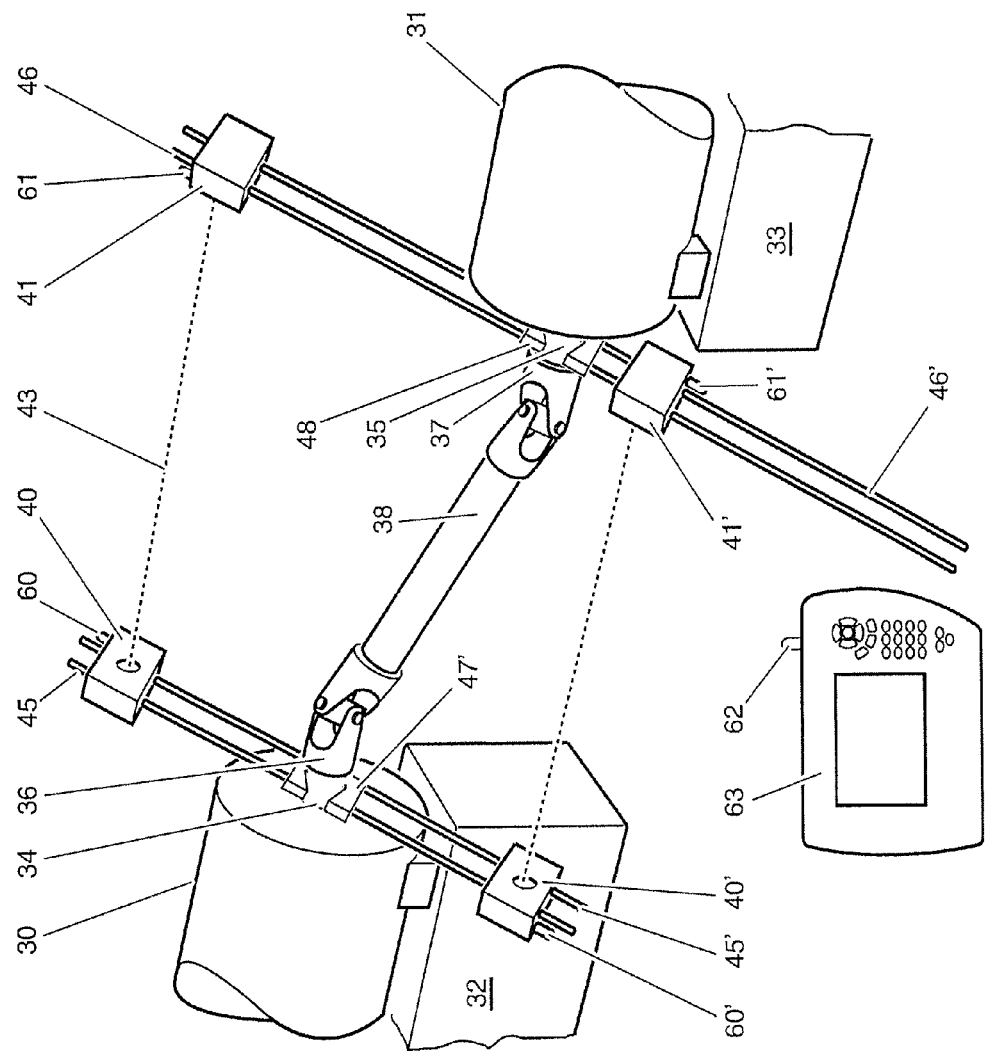
FIG. 1 is a perspective view of the device with two shafts and the connecting shaft with the two universal joints, and a schematic depiction of the alignment method with the optical alignment device.
Figure 2A:
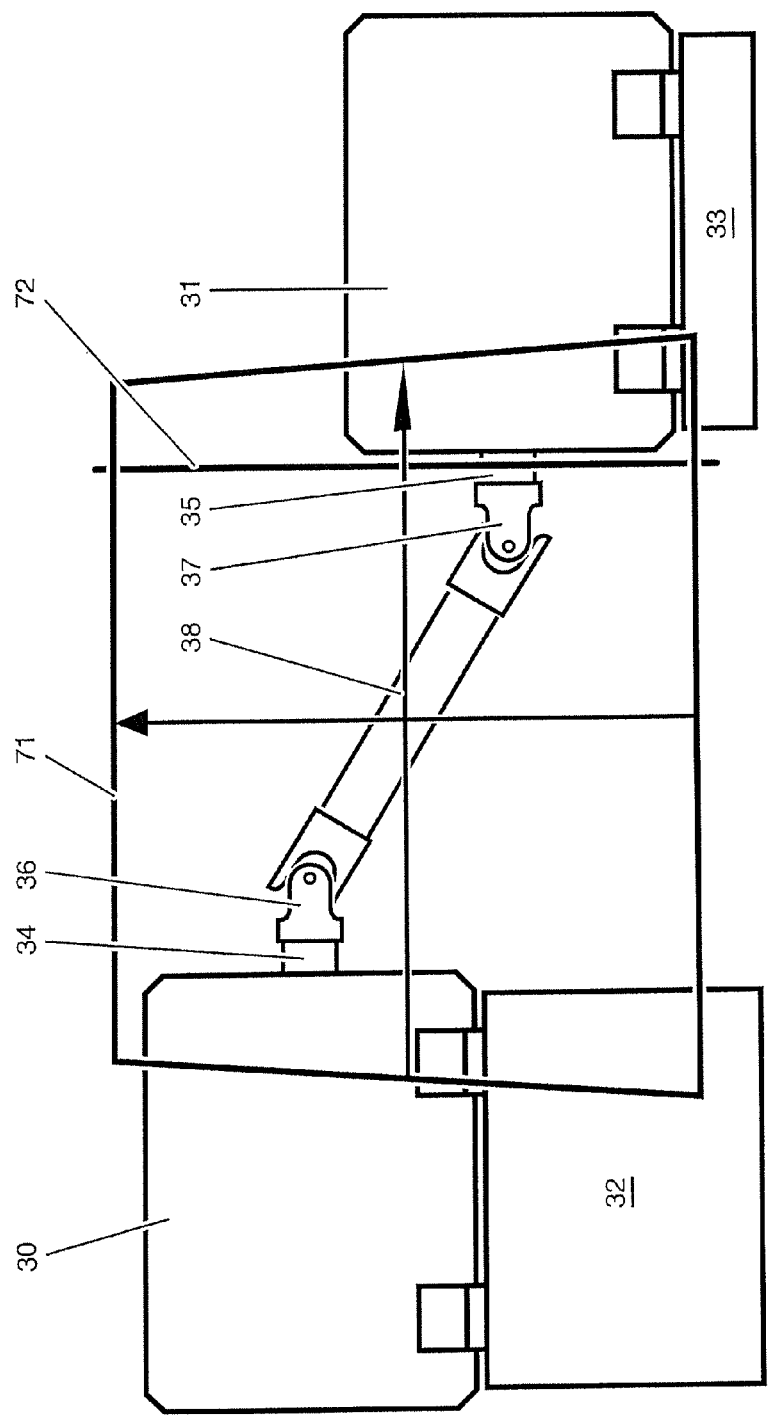
FIG. 2a is a representation of the geometrical conditions, viewed horizontally, perpendicular to the axes of the two machine components.
Figure 2B:
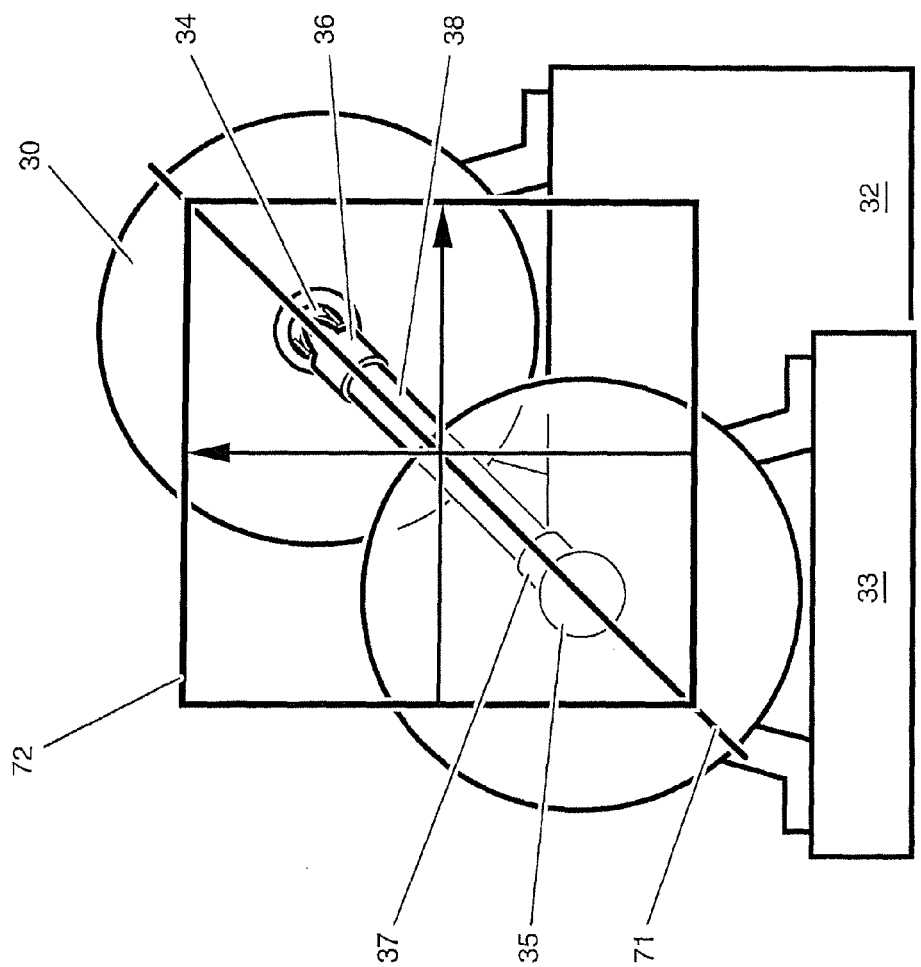
FIG. 2b is a representation of the geometrical conditions in a viewing direction along the axes of the two machine components.
Figure 2C:
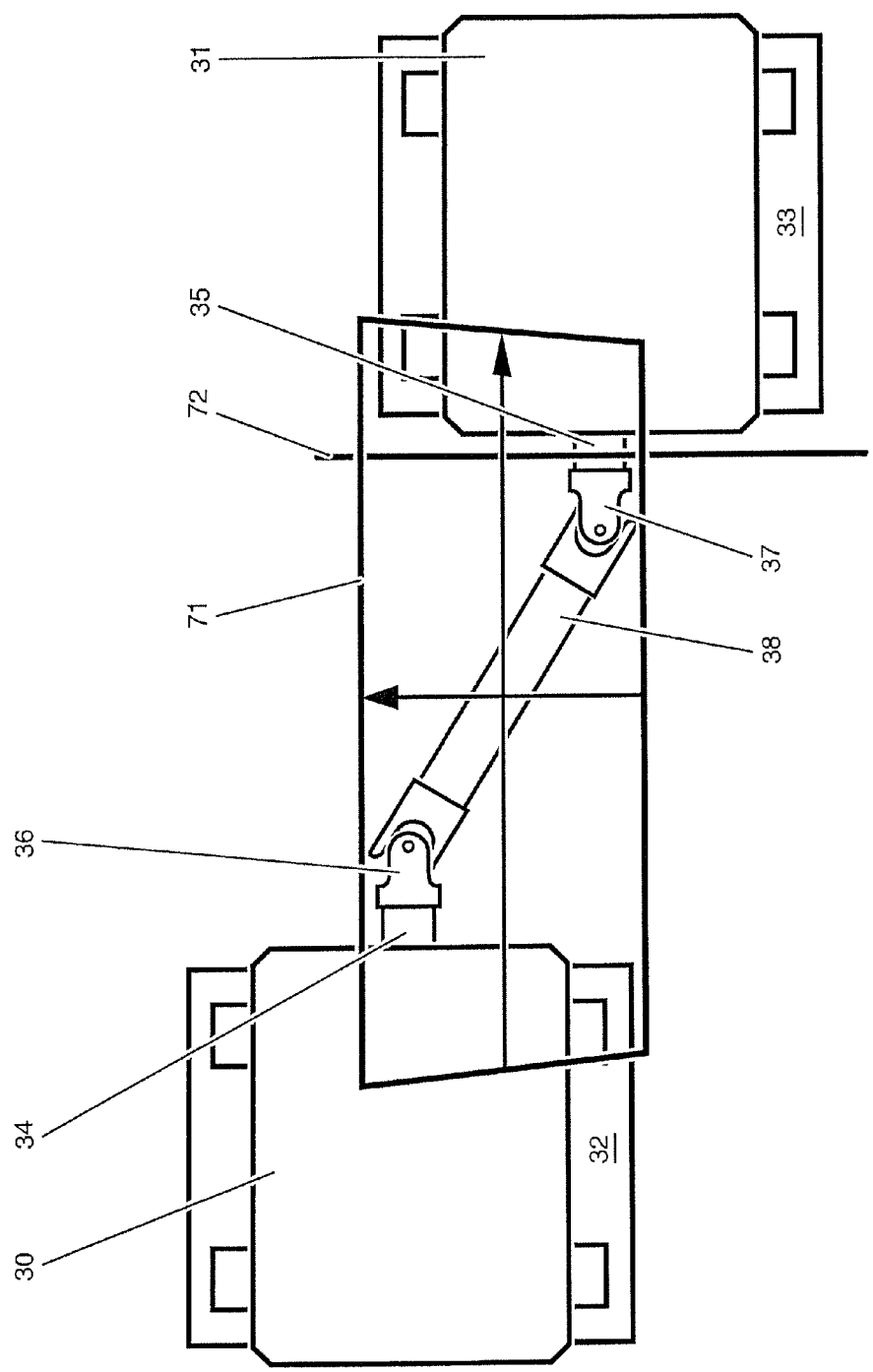
FIG. 2c is an overhead plan view of the geometrical conditions.
Figure 3A:
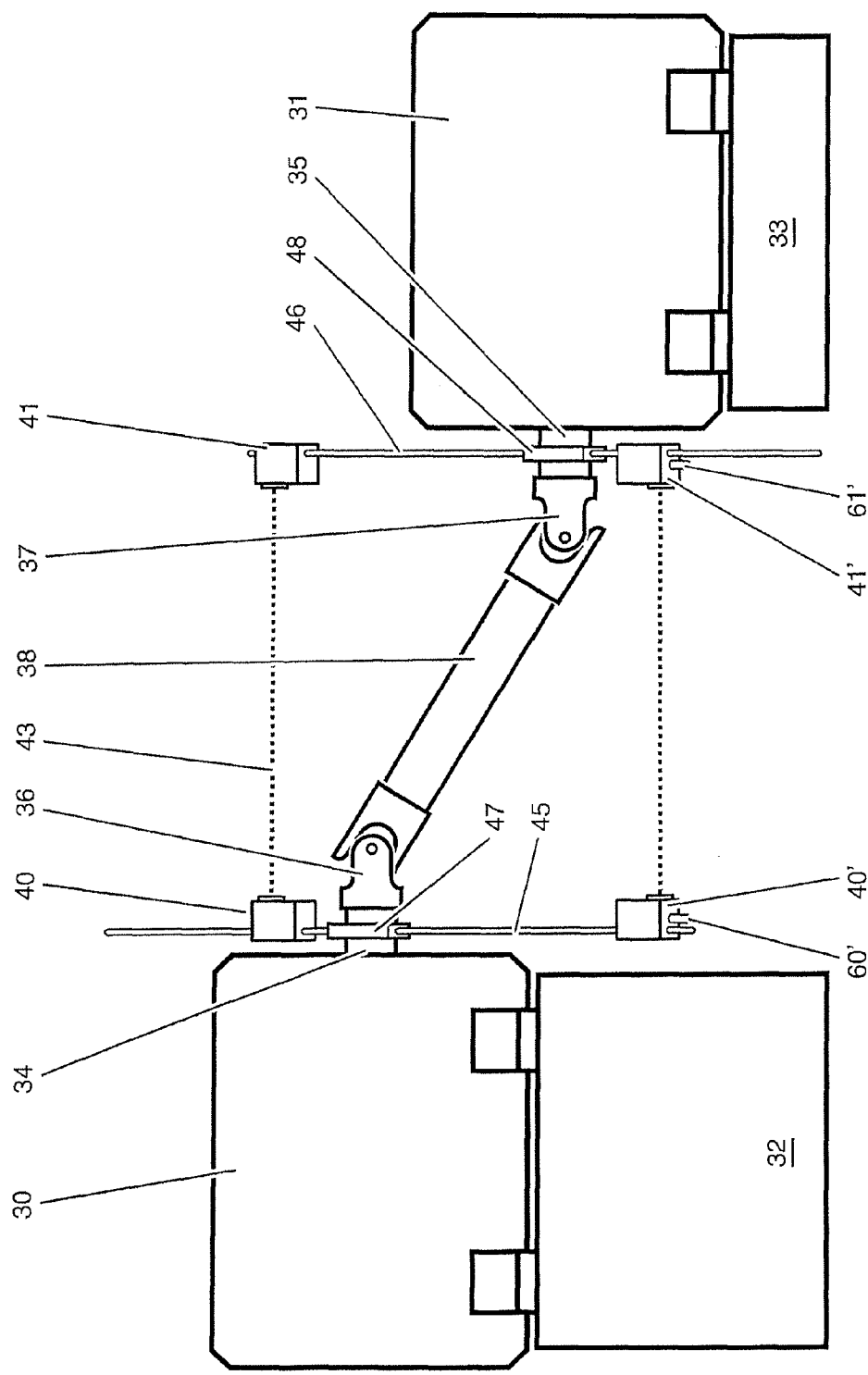
FIG. 3a shows the invention in conjunction with the optical alignment device, viewed horizontally perpendicular to the axes of the two machine components.
Figure 3B:
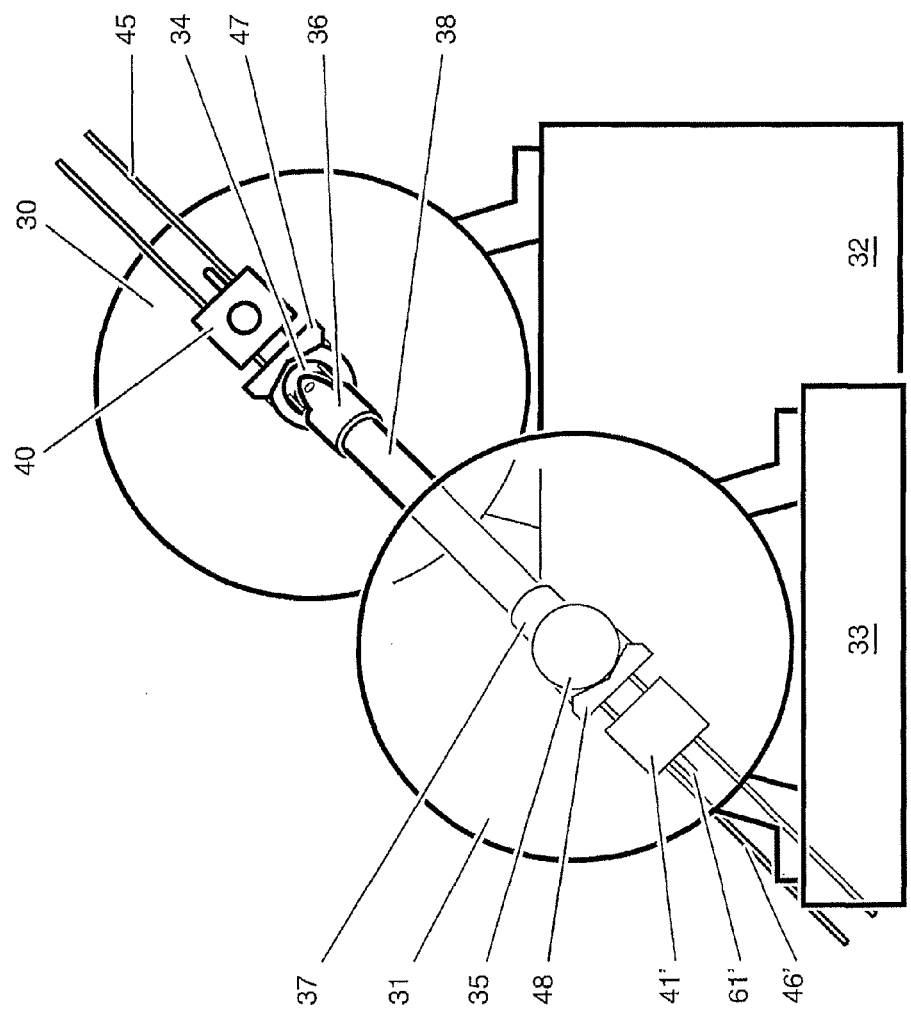
FIG. 3b shows the invention in conjunction with the optical alignment device in a viewing direction along the axes of the two machine components.
Figure 3C:
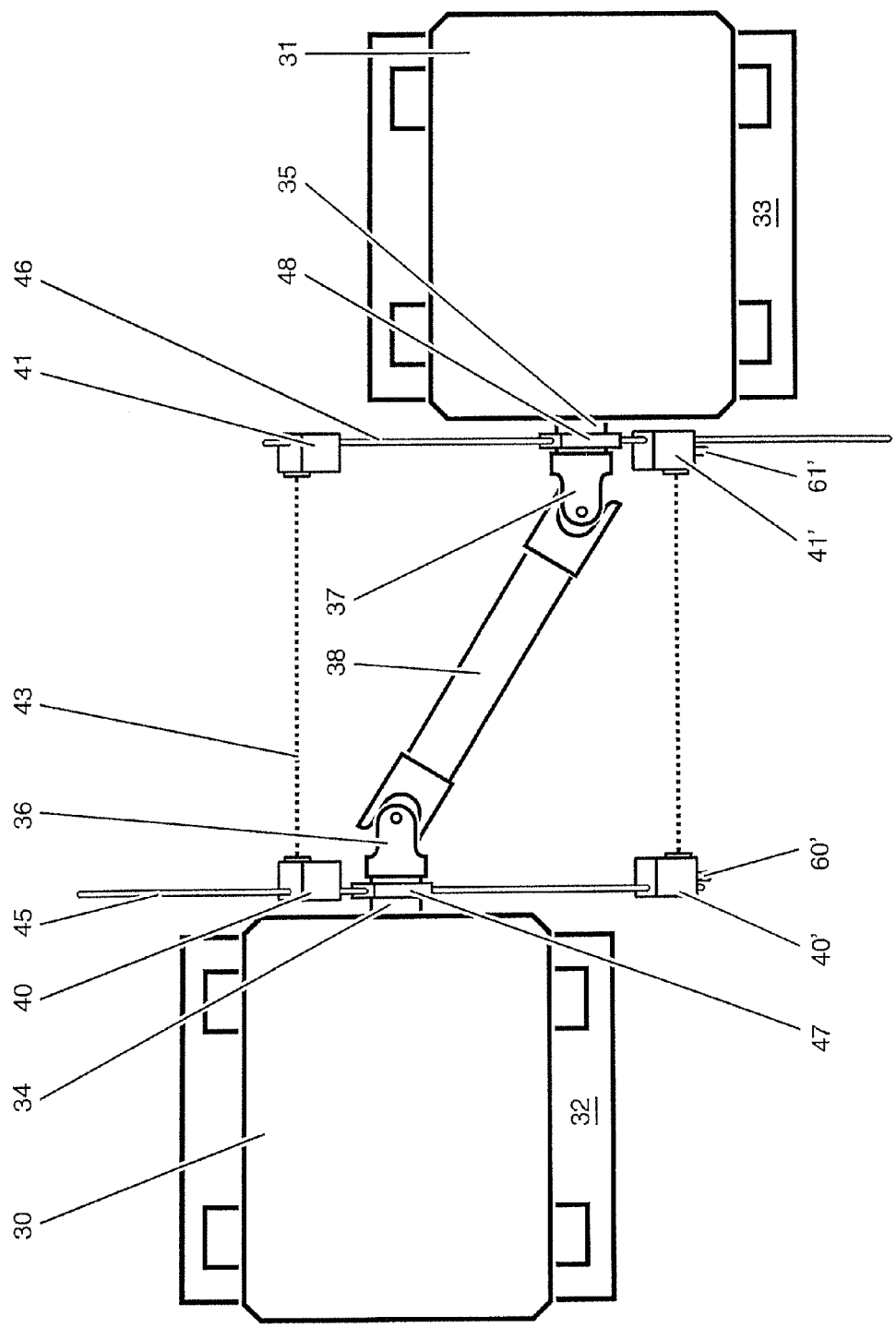
FIG. 3c shows the invention in conjunction with the optical alignment device in an overhead plan view.

FIG. 1 as well as FIGS. 2 and 3 show a first machine or machine component 30 with a shaft 34 on a first base 32 and a second machine or machine component 31 with a shaft 35 on a second base 33. The shafts of these two machines or machine components are essentially parallel in the orientation of their axes, but offset to one another in at least one of the two directions perpendicular to the axis direction of the two shafts. Therefore, on the ends of the shafts 34, 35 there is a respective universal joint 36, 37. The two universal joints 36, 37 are connected to one another using a third shaft 38.

It is generally known that, for correct operation of a unit of three shafts connected to two universal joints 36, 37, the two conditions that must be satisfied are, first, that the two forks of the universal joints be located on the third shaft 38 in one plane and that, second, the angles of the shaft 38 at the two universal joints 36, 37 be identical. Many authors specify as a third condition that all three shafts 34, 35 and 38 are located in one plane. This third prerequisite is, however, a necessary consequence of the two first named conditions.

The steps a) to e) are established in accordance with the invention based on the finding that a measurement of the angular offset with a conventional optical alignment device in only two measurement positions is accurately possible when the two measurement heads of the alignment device are located in the plane formed by the three cardan shafts (see third "condition"). When these steps are being carried out, it is necessary for the detection of the impact points of the light beam to take place in two dimensions. Therefore, a detector must be used which can be read out two-dimensionally. Alternatively, it is also possible for two light beams and two one-dimensional detectors to be used when the two detectors run in different directions, therefore, for example, are arranged at a right angle to one another.

In order to take a measurement of the alignment of the two shafts 34, 35 relative to one another, in accordance with the invention, a few simple method steps are necessary as compared to the prior art. An optical alignment measurement of two shafts relative to one another takes place in two angular positions of the measurement heads of the optoelectronic alignment device, which positions are offset by 180°, relative to the axes of the two shafts.

The measurement heads 40, 41 can be arranged on their holding devices 45, 46 such that the light beam or beams 43 emitted from them run in the plane 71 which is formed by the two shafts 34, 35 and the connecting third shaft 38. When using an alignment device with one light beam fanned out in one plane, the plane of this light beam will be perpendicular to the plane of the two shafts. Here, for the two measurement heads, the same angular position relative to the axes to be measured must always be approached.

For better understanding, at this point, the devices are described which connect the measurement heads of the optoelectronic alignment devices which have been described in the prior art to the shafts which are to be aligned relative to one another. They ordinarily comprise a clamping device which provides for a fixed and rigid connection of the measurement head to the shaft. These clamping devices contain a body for placing against the jacket surface of a cylindrical shaft. This body is often a block 47, 48 with a prismatic recess. Such a block with a prismatic recess can be easily mounted on shafts of different diameters so that the apex line of the prismatic recess runs exactly parallel to the shaft axis. The fixed connection of the body to the shaft is produced by locking the block with the prismatic recess on the shaft. This locking takes place via spring sheets or chains which are conventionally secured with clamping or tightening screws. Holding devices in the form of rods or pipes 45, 46, which are mounted parallel to one direction and which run radially relative to the shafts 34, 35, are mounted on the blocks of these clamping devices. The housings of the measurement heads then have corresponding holes in which these rods run. The measurement heads are then fixed on these rods 45, 46 with clamping devices, for example, tightening screws or quick-acting closures. This arrangement of the measurement heads 40, 41 on rods 45, 46 makes it possible to mount the measurement heads at different distances from the shaft axis. Thus, the light beam cannot be blocked by a clutch which connects the two shafts. The carrier for a measurement head therefore comprises the clamping device for attachment to the shaft and a holding device for the measurement head, for example, rods, pipes, or the plates of U.S. Pat. No. 4,518,855, which is hereby incorporated by reference to the extent necessary to complete an understanding of this aspect of the invention. The body or block of the clamping device provides for a stable connection between the shaft, on which it is clamped, for example, with a chain, and the holding devices, therefore rods, pipes 45, 46 or alternatively the a V-block and strap device of U.S. Pat. No. 4,518,855.

When measuring two shafts which are connected only via a clutch, therefore, when measuring essentially coaxial shafts, it is easily possible to approach several optional angular positions of the two shafts which are connected to one another by being turned jointly. Once the two measurement heads are aligned to one another, the light beam even in other angular positions reliably strikes the detector. Corrections are only necessary for very serious misalignments.

However, when the angular offset of two shafts connected to one another via a universal joint and a third shaft is to be measured, it is shown that when the measurement heads turn around the shafts or when the measurement heads with the shafts connected to one another turn, the light beam misses the detector at a far distance due to the parallel offset of the two shafts. The invention is based on the following finding: only when the two measurement heads 40, 41 are located in the plane formed from the three shafts, therefore in two measurement positions offset by 180° in this plane, is a measurement possible. In these two positions, the position of the two measurement heads which has been measured peripherally (therefore in a direction perpendicular to the shaft axis and tangentially to the periphery of the shaft) is identical. When the two shafts are turned by 180°, only a displacement of one of the two measurement heads in the radial direction is necessary so that the light beam or beams of the measurement heads again strike the sensor or sensors. A correction in one tangential direction is not necessary. Of course, it is even less necessary to move the measurement head along one of the axes of the shafts.

The measurement method is therefore carried out in the steps which were briefly described above and which are now explained in detail below.

Step a) Determining the Plane of the Three Shafts.

A clamping device with a measurement head 40 of an alignment device is located on the shaft 35. The measurement head 40 sends a light beam 43 in the direction to the second machine or machine component 31. The second machine or machine component 31 has a second shaft 35. A universal joint 36 is mounted on this shaft 35. A third shaft 38 connects the universal joint 36 to the second universal joint 37 on the shaft 35.

The first measurement position can in principle be determined by geometrical plotting in an auxiliary plane 72 perpendicular to the plane 71 of the two shafts (FIGS. 2a, 2b) by the point of impact of the laser beam on an end shield or another suitable flat surface, which is arranged on the shaft 35 to which the source of the light beam is not attached such that the normal of this flat surface runs in the direction of the axis of this shaft 35, being plotted in three angular positions of the transmitting device of the light beam. The three points of impact which have been determined in this way form a circle. The connecting line between the center point of this circle and the point in which the axis of the shaft pierces the flat surface points in the direction of a straight line which together with the shaft axis forms the plane of the three shafts. This auxiliary plane 72 can be an end shield or a plate of a machine lining. When a suitable surface cannot be found on the machine, this surface can be produced by placing a plane (for example, a piece of cardboard or a board) perpendicular to the shaft. Here, it must simply be watched that the light source used is easily visible on the plane.

The first measurement position or the plane which is common to the shafts, however, can be especially easily determined by direction finding along a line of sight of the drive shafts or driven shafts.

Conventionally, in an optical alignment device which has only one light beam the measurement head with the light source of this beam is mounted on the machine or machine component whose position in the alignment process cannot be changed. If, for example, a complex machine has a pump, a fan or a roller with a driven shaft and a motor which drives the pump, the fan or the roller, the position of the pump, the fan or the roller is normally stipulated, for example, by the disposition of the pipes or the path of the material transported on the roller. The position of the motor can, however, be changed in order to produce an optimum alignment according to the aforementioned two conditions. When the alignment device has a light source in only one of the two measurement heads, the measurement head with the light source is conventionally mounted on the shaft of the machine component which is not moving, therefore, the pump, fan or roller. This was originally fixed in this way because in correction of the position of one of the two machines when the measurement head with the light source is mounted on the machine which is being offset, especially for large measurement distances, an overly large offset between the measurement heads with light source and detector can occur, especially when the distance between the measurement heads is one meter or more.

This attachment of the light source and detector is, however, also preferred in the measurement of two shafts which are connected via two universal joints and a third shaft, when only one of the measurement heads contains a light source. There, the shaft of the machine which cannot be offset and the third shaft which connects the universal joints fix the plane of the aforementioned third "condition." For alignment devices which have two light sources in different measurement heads, according to the aforementioned, it is also a good idea for determining the plane in which the measurement heads are to be located to use that light source which is attached to the machine component which is not to be moved. In the figure, the machine 30 with the shaft 34 was chosen to be stationary and the machine 31 with the shaft 35 was chosen to be movable.

Thus, for example, in FIG. 1, the measurement head 40, 40' which contains the light source is mounted on the shaft 34 of the stationary machine component 30. When the light source is located radially relatively near the shaft 34, the light beam strikes the third shaft 38 when the clamping device is suitably mounted. At this point, the clamping device is turned around the shaft 34 until the light beam strikes exactly the middle of the shaft 38. This middle of the shaft 38 is exactly the point along a peripheral line of the shaft or the line on the shaft 38 which the light beam describes in its (tangential) displacement along the periphery of the shaft 34 on which the measurement head 40' with its light source is attached, which head is nearest the light source. It is useful to check this alignment in another (radial) position of the measurement head 40'. This checking takes place by the measurement head being pushed along the holding device (here formed by two rods) in a direction which runs radially relative to the shaft 34. Then, the alignment of the clamping device on the shaft 34 is checked using the impact point of the light beam which has been emitted from the measurement head on the shaft 38 and is optionally corrected.

When the light source has the possibility of fine adjustment of the direction of the emitted light beam, via ascertaining the impact site of the light beam which has been emitted from the measurement head 40' at positions of the measurement head 40' which are variously distant radially from the axis of the shaft 34 using the rotation of the clamping device around the shaft 34 and using the fine adjustment of the direction of the light beam, an alignment of the measurement head 40' and of the light beam which has been emitted from the measurement head into the plane which is common to the three shafts and in a direction parallel to the axis of the shaft on which the measurement head is attached can be done very accurately. Another possibility for checking the alignment of the light source involves removing the measurement head from the rods after adjusting the emission direction and reattaching it to the rods in the reversed position (so-to-speak "headfirst") and in checking the alignment to the third shaft and optionally iteratively correcting it.

Afterwards, the measurement head 40' is pushed along the rods away from the shaft 34 in the radial direction so far that the light beam emitted from this measurement head no longer strikes the third shaft 38, but the second measurement head 41' which is attached to the shaft 35. The measurement head 41' can accordingly be located on its rods opposite the measurement head 40' and is thus likewise in the plane formed from the three shafts 34, 35, 38.

This type of determination of the plane 71 which has been formed by the three shafts 34, 35, 38 can be combined with the traditional procedure of attaching the light source to the fixed machine component 30 which cannot move because, in this way, the plane 71 is determined using the shaft 34 of the stationary machine component 30 and the third connecting shaft 38. The position of the movable component 31 is changed in the alignment process. This could, in turn, cause a change of the three-dimensional location of the plane of the three shafts if the shaft 35 of the movable component 31 were used to determine this plane.

Likewise, it is possible to determine the plane of the three shafts 34, 35, 38 with a light source other than the one contained in one of the measurement heads. For example, a laser pointer can be used.

In a third type of determination of the plane of the three shafts 34, 35, 38, it is determined based on the geometrical circumstances. This takes place first by measuring the distance between the universal joints which can be determined, for example, by vertical projection of the shafts or their extensions on the floor of the hall. In this vertical projection, the measurement of the lateral distance of the shafts 34, 35 then takes place. Alternatively or additionally, measurement of the vertical difference between the two shafts is done depending on whether only one lateral or one vertical offset or both are present. If the angle of the plane relative to the vertical or horizontal has been determined in this way, using an inclinometer which can be present in one of the measurement heads 40, 41, the measurement head can be arranged on the shaft. This angle to the horizontal or vertical can, of course, also be taken from the construction data, for example, a drawing.

Step b) Measurement of the Impact Position of the Light Beam or Beams in the First Measurement Position.

If the clamping device and the measurement head 40' are now aligned to the middle of the third shaft 38, at this point on the shaft 35 the second measurement head 41' with its clamping device is attached to the rods such that the angular position of the clamping device with the rods on the shaft 35 corresponds to the position found by step a) above for the clamping device mounted on the shaft 34 with the rods. This means that the rods 45', 46' of the two measurement heads 40', 41' can be aligned in parallel. Then, the position of the impact point of the light beam or of the impact points of the light beams on the detector or detectors is measured and transmitted to a computer 63 which is used to evaluate the data which have been determined. When the orientation of the measurement head 45' and 46' is known, for example, via an inclinometer which is present in this measurement head, it can also be transmitted to the computer and can be input into the computer by the user.

Step c) Approaching the Second Measurement Position, i.e., the Position 180° from the First Measurement Position.

To do this, the three shafts 34, 35, 38 are turned by 180° or the two clamping devices are displaced by 180° around the shafts. This is possible especially easily when there is an inclinometer in at least one of the two measurement heads 40, 41. This measured value of the inclinometer is displayed on a computer 63 which is used to display the measured value of the alignment devices. It is also possible to compute this measured value with the measured value found by step b) above, and to show on the display of the computer 63 whether the measurement heads are, at this point, within a given region of the angle to be approached. Other suitable inclinometers are displayed on the measurement head itself and/or read off. These other suitable inclinometers can be simple pointers with an angle scale. A rotation angle transducer on at least one of the two shafts 34, 35 can also be used, if it is present and its measured value is available in the determination of the alignment. Due to the still unknown misalignment, it is also possible, but not so exactly, to attach the light source or the measurement head with the light source after approaching presumably 180° from the position found by step a) above on the shaft of the movable machine and to align it to the middle of the third shaft. If the shafts 34, 35 are not arranged horizontally, instead of or in addition to the inclinometer, a compass is preferably used, especially a gyro compass or another gyroscope.

In this position, which has been found in this way, the light beam or beams of the measurement head or measurement heads will run again in the plane which has been formed from the three shafts, compared to the position of the measurement heads in step a), but on the other side of the shafts 34, 35.

It is apparent that the rods 45, 46 or holding devices must extend radially at least so far that they can bridge the parallel offset of the two shafts, measured from the two axis centers. If the two measurement heads on their holding devices are displaced around the two shafts, which can be recommended only for exactly produced holding devices and for exactly cylindrical smooth shaft surfaces, in principle, a radial extension of the holding devices/rods 45, 46 by the sum of the parallel offset and the minimum distance at which a measurement head can be attached from the axis of the respective shaft is sufficient. If only one of the two measurement heads is to be shifted on its holding device, this amount should be doubled. In this case, the radial extension is therefore twice the parallel offset plus twice the minimum distance in which a measurement head can be attached from the axis of the respective shaft.

Step d) Measurement of the Impact Position of the Light Beam or Beams in the Second Measurement Position.

After turning by 180°, the two measurement heads 40, 41 are in a position in which only a displacement of the measurement heads 40, 41 radially to the shafts 34, 35 is necessary so that the laser beam or beams again strike the detector or detectors. Then, the position of the impact point of the light beam or the impacts points of the light beams on the detector or detectors can be determined. Alternatively, also only one of the two measurement heads 45, 46 can be shifted when the holding devices are long enough, as in the previous paragraph.

Step e) Computation, and Optionally, Correction of the Angular Offset between the Shafts 34, 35

In the initially mentioned prior art, it is described how a determination of the angular offset is possible when the measurement heads are mounted in two positions which are offset by 180° relative to one another. In order to determine the angular offset in the plane of the three shafts 34, 35, 38, the coordinates of the impact point or points of the light beam or beams in a direction perpendicularly to the propagation direction of the light beams and in a direction which is radial relative to the respective shaft are used. In order to determine the angular offset in the direction perpendicular to the plane of the three shafts 34, 35, 38, the coordinates of the impact point or points of the light beam or beams in a direction perpendicular to the propagation direction of the light beams and perpendicular to a direction which is radial to the respective shaft are used. To do this, the distance of the two measurement heads 40, 41 in the propagation direction of the light beam must be known. This distance can be determined, for example, with a tape measure.

The conversion from the coordinate systems of the measurement heads into the coordinate system of the machine components takes place using the rotary position of the shafts which was determined with the inclinometer, the compass or the gyroscopes. With the angular offsets which are obtained in this way, at this point, the position of the machine which is to be moved can now, optionally, be corrected by displacement and using shims so that the two shafts 34, 35 are aligned parallel.

Here "optionally" means that the angular offsets which are measured in the two dimensions exceed stipulated tolerances. In an optionally necessary correction, the distances between the measurement heads and the bases of the movable machines must be considered to compute the required displacements (for example, by placing so-called shims underneath or by lateral displacement). This is possible using simple geometrical considerations. This computation of the required correction values for the respective machine bases is performed in the measurement head/heads themselves, a computer 63 which belongs to the measurement device, or another computer to which the measured values of the detectors in the measurement heads are transmitted. This computer, which can be located in the measurement heads 40, 41 themselves, receives the measured values of the detectors normally via a wire line. In particular, for computers 63 which are not located in the measurement heads, the transmission of the measured values from the detection electronics in the measurement heads can take place wirelessly. For illustration of the wireless data transmission the figures show the following antennas: the antenna 62 on the computer 63, the antenna 60, 60' on the measurement head 40, 40' and the antenna 61, 61' on the measurement head 41, 41'.

When the measurement heads 40, 41 remain in the second measurement position, the effect of a correction at the machine bases can be observed directly on the display of the computer 63.

In the aforementioned description, the method in accordance with the invention was described with the installed third shaft 38 which connects the two shafts 34, 35 which are to be aligned. This is the operating state. It goes without saying that the method can be used in just this way when the third shaft has been dismounted for maintenance purposes. Here it should simply be watched that when all process steps are carried out, the relative angular position of the two shafts corresponds to the operating state.

What is claimed is:

1. Method for aligning a first shaft relative to a second shaft which are connected or which can be connected via two universal joints and a third shaft, using an optoelectronic alignment device which in a first and a second measurement head contains at least one light source for emitting a straight-line or fanned out light beam and at least one detector which can be read out two-dimensionally for receiving the light beam, the first measurement head being mounted on the first shaft and the second measurement head being mounted on the second shaft with a respective clamping device, comprising the following steps:
   a) determining a plane in which the first, second and third shafts lie and a first measurement position in the plane of the three shafts,
   b) emitting a straight-line or fanned out light beam from said at least one light source and measuring a point or points of impact of the light beam or beams on said least one detector with the measurement heads of the optoelectronic alignment device in a first measurement position,
   c) turning the first, second and third shafts and the clamping devices around the first and the second shafts into a second measurement position which is 180° away from the first measurement position, and moving at least one of the first measurement head and second measurement head on the respective clamping device in a radial direction relative to the respective shaft so that at least one light beam strikes at least one detector,
   d) measuring a point or points of impact of the light beam or beams with the measurement heads of the laser alignment device in the second measurement position, and
   e) determining an angular offset between the first and the second shafts from the measured values of the points of impact.

2. Method in accordance with claim 1, comprising the further step of correcting the angular alignment of the first and second shafts.

3. Method in accordance with claim 1, wherein a relative three-dimensional orientation of the first and second measurement position is determined with at least one of at least one inclinometer and a gyroscope in at least one of the measurement heads.

4. Method in accordance with claim 1, wherein a relative three-dimensional orientation of the first and second measurement position is determined with at least one rotational angle transducer on one of the first and second shafts.

5. Method in accordance with claim 1, wherein the step determining a plane in which the first, second and third shafts lie comprises emitting a light beam from a light source mounted on of the first and second shaft such that the light beam runs parallel to the respect one of the first and second shaft so as to strike the third shaft, and then, moving the light source into the plane determined by the light source being shifted while maintaining the alignment parallel to the respective shaft, such that the impact point of the light beam on the third shaft is moved to a point nearest the light source along a peripheral line of the third shaft.

* * * * *